(12) United States Patent
Ramanan

(10) Patent No.: US 6,785,725 B1
(45) Date of Patent: Aug. 31, 2004

(54) SIGNALING ADDRESS RESOLUTION IN A COMMUNICATION NETWORK

(75) Inventor: Gopinath Ramanan, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/561,373

(22) Filed: Apr. 28, 2000

(51) Int. Cl.$^7$ .............................................. G06F 15/16
(52) U.S. Cl. ..................... 709/227; 709/252
(58) Field of Search ................. 712/21, 11; 370/356, 370/699, 403, 355, 466, 392, 400; 709/245, 238, 207, 216, 204, 226, 251, 252, 227; 359/326; 398/59

(56) References Cited

U.S. PATENT DOCUMENTS

| | | | | |
|---|---|---|---|---|
| 3,796,835 A | * | 3/1974 | Closs et al. .................. 370/355 |
| 4,414,624 A | * | 11/1983 | Summer et al. .............. 712/21 |
| 4,704,713 A | | 11/1987 | Haller et al. .................... 370/3 |
| 4,953,156 A | | 8/1990 | Olshansky et al. ............. 370/3 |
| 4,989,200 A | | 1/1991 | Olshansky et al. ............. 370/3 |
| 5,016,242 A | | 5/1991 | Tang .............................. 370/3 |
| 5,216,670 A | * | 6/1993 | Ofek et al. .................. 370/403 |
| 5,448,389 A | * | 9/1995 | Peacock ....................... 398/59 |
| 5,465,254 A | * | 11/1995 | Wilson et al. .............. 370/466 |
| 5,524,219 A | | 6/1996 | Li .............................. 395/310 |
| 5,530,694 A | | 6/1996 | Guezou et al. ............. 370/16.1 |
| 5,548,431 A | | 8/1996 | Shin et al. ................... 359/119 |
| 5,568,475 A | * | 10/1996 | Doshi et al. ................ 370/399 |
| 5,684,956 A | * | 11/1997 | Billings ...................... 709/219 |
| 5,737,319 A | | 4/1998 | Croslin et al. |
| 5,936,450 A | | 8/1999 | Unger ......................... 327/237 |
| 5,963,943 A | | 10/1999 | Cummins et al. |
| 5,978,115 A | | 11/1999 | Condict et al. |
| 6,163,392 A | | 12/2000 | Condict et al. |
| 6,205,122 B1 | | 3/2001 | Sharon et al. |
| 6,317,252 B1 | * | 11/2001 | Vahala et al. ............... 359/326 |
| 6,351,798 B1 | * | 2/2002 | Aono .......................... 712/11 |
| 6,522,654 B1 | * | 2/2003 | Small .......................... 370/400 |
| 6,535,507 B1 | * | 3/2003 | Li et al. ...................... 370/356 |
| 6,714,541 B1 | * | 3/2004 | Iyer et al. .................... 370/392 |

* cited by examiner

Primary Examiner—John Follansbee
Assistant Examiner—Kenny Lin
(74) Attorney, Agent, or Firm—Michael Cammarata; Shailendra Bhumralkar; Jason Rhodes

(57) ABSTRACT

A network configuration and method provide communication setup between neighbor nodes in a communication network, without broadcasting this setup information over the network. A signaling bandwidth separated from the data communication channel bandwidth facilitates address resolution over a common transmission medium. The user is not required to know any physical address properties of the neighbor nodes. This reduces the complexity of the information that a network administrator is required to manage. This processing feeds into a complete address resolution table, which is employed for controlling network communication over the main data communication channel bandwidth. Typically, substantially continuous transmission and/or reception over the signaling bandwidth is useful not only to determine the neighbor node's active address upon startup, but also while the network is running, to detect if a signaling element has been exchanged or has changed activity. The address resolution is automatically updated to reflect a new configuration.

29 Claims, 4 Drawing Sheets

SIGNALING ADDRESS RESOLUTION IN A COMMUNICATION NETWORK

FIELD OF THE INVENTION

This application relates to communication networks. In particular, it relates to a technique for automated communication setup between neighboring nodes in a ring or mesh communication network.

BACKGROUND

In a ring configured communication network, a given node has an 'East' and a 'West' neighbor node. For an application to communicate with a neighbor node, it needs to know the neighbor's physical address for delivery of information over the physical medium of the network. This is the address resolution that is required.

When an ethernet is used in a ring topology, the destination MAC address (ethernet address) is necessary for sending a data frame to the neighbor node. Normally, for IP (Internet Protocol) packets, standard ARP (Address Resolution Protocol) can be used to bind the IP address to a MAC address. However, this would require extension for non-IP traffic. Additionally, the fact that the ethernet is connected in a ring topology for an optical ring poses problems for sending broadcast queries (which is the basis of ARP). If broadcast frames are sent around a ring, for example, the frames will circulate forever, creating a "broadcast storm."

Thus there is a need in the art for a method and a system to transmit the address of a neighbor node of a communication network without broadcasting over the network. Further, there is a need to transmit the address of such a neighbor node automatically and dynamically, such that the network updates itself without a requirement for user knowledge of any of the physical address properties of the neighbor node, thereby reducing the complexity of information that a network administrator is required to manage.

OBJECTS AND ADVANTAGES OF THE INVENTION

It is a primary object of this invention to provide a method and a system to transmit the physical address information of a neighbor node of a communication network without broadcasting over the network. Further, it is an object of this invention to transmit the address of such a neighbor node automatically and dynamically, such that the network updates itself. Additionally, it is an object of this invention to employ such transmitted physical address information to control network communication between neighbor nodes. Moreover, it is an object of this invention to perform such transmitting and control functions without a requirement for user knowledge of any of the physical address properties of the neighbor node, thereby reducing the complexity of information that a network administrator is required to manage.

SUMMARY OF THE INVENTION

In accordance with embodiments of the present invention, a network configuration and method provide automated communication setup between neighbor nodes in a communication network, without broadcasting this setup information over the network. Network nodes are connected to network devices, for example microcontrollers.

A signaling bandwidth separated from the data communication channel bandwidth solves the problem of address resolution to a MAC address automatically and dynamically by multiplexing over a common transmission medium. The transmission medium can be an electrical conductor or an optical fiber. The user is not required to provide any of the physical address properties of the neighbor nodes. This reduces the complexity of the information that a network administrator is required to manage.

Furthermore, the network and method according to the invention do not use a broadcast mechanism within the data channel to resolve the address of the neighbor node. Instead, they employ a link-terminated mechanism outside of the data communication channel bandwidth to perform dynamic neighbor discovery. This processing is distributed, and the resulting information feeds into a complete address resolution table, which is employed for controlling network communication, for example sharing an application, between neighbor nodes over the main data communication channel bandwidth. Once resolved, for example in an optical ring the physical address information is carried over the OSC (Optical Supervisory Channel). This technique can also scale to systems beyond a ring network configuration to bus and mesh network topologies. Appropriate communication network protocols can include Ethernet carrying IP or proprietary format traffic.

Typically, transmission and reception between neighbor nodes over the signaling bandwidth is performed using transmit and receive cards installed in the network devices connected to the respective nodes. Transmit/receive functions are sometimes combined into a "signaling card." Received physical address information is provided by the signaling card to a network control device or processor, which constructs the address resolution table and controls network communication between neighbor nodes in the data communication channel bandwidth.

Some embodiments of the invention rely on substantially continuous transmission and/or reception over the signaling bandwidth to send address information between neighbor nodes. This is useful not only to determine the neighbor node's active address upon first starting up, but also while the network is running, to detect if a signaling element has been swapped out or has changed activity. The address resolution is automatically updated to reflect a new configuration.

In some implementations according to the invention, there can be a multiplicity of neighboring network nodes, any of which can transmit physical address information to any neighbor node over the signaling bandwidth. The physical address information is used at any receiving neighbor node or nodes to obtain a network configuration.

DESCRIPTION OF THE FIGURES

The present invention may be better understood, and its numerous objects, features, and advantages made apparent to those skilled in the art by referencing the accompanying drawings. For simplicity and ease of understanding, the use of similar reference symbols in different drawings indicates similar or identical items.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
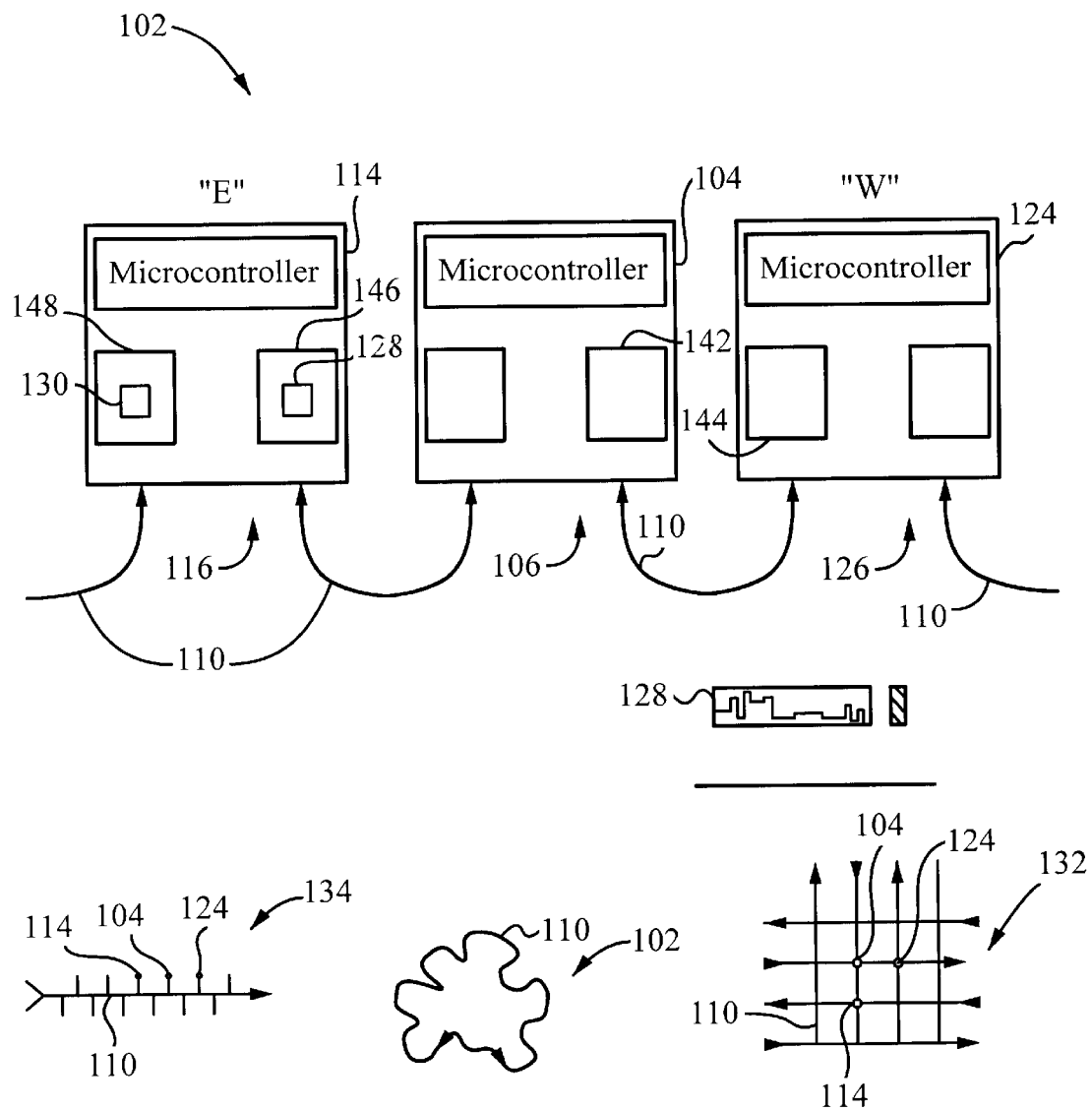
FIG. 1 is a schematic diagram of a communication network having multiple nodes.

FIG. 1 is a schematic diagram of a communication network having multiple nodes. An ethernet ring communication network 102 operates according to an IP-Protocol over a transmission medium 110, for example an electrical conductor or an optical fiber. A first network device, for example a microcontroller 104, is connected to a node 106 of communication network 102. Neighboring network devices, for example microcontrollers 114 and 124, are connected respectively to an "East" neighboring node 116 and a "West" neighboring node 126 and are designated respectively as East neighboring network device 114 and West neighboring network device 124. Collectively, neighboring network devices 114, 124 are designated as second network devices. In communication network 102 any network device at any node can be designated as a first network device 104 having East and West neighboring second network devices 114 and 124 respectively connected to neighboring nodes, similar to the example of nodes 106, 116, and 126 described above. Thus communication network 102 can include a multiplicity of first network devices 104 and second network devices 114, 124.

Additionally, communication network 102 can include a network control device 114, 124. Each network control device 114, 124 can include microcontrollers 128, 130 that can take over activity for neighbor node signaling. Further, a communication network can be configured such that a first network device 104 has more than two neighboring second network devices 114, 124.

Transmission medium 110 is typically "daisy-chained" between neighboring nodes and carries both a communication channel bandwidth for network communication and a signaling bandwidth outside the communication channel bandwidth. The signaling bandwidth is utilized for non-broadcast communication between first network device 104 and neighboring second network devices 114, 124.

Figure 2:
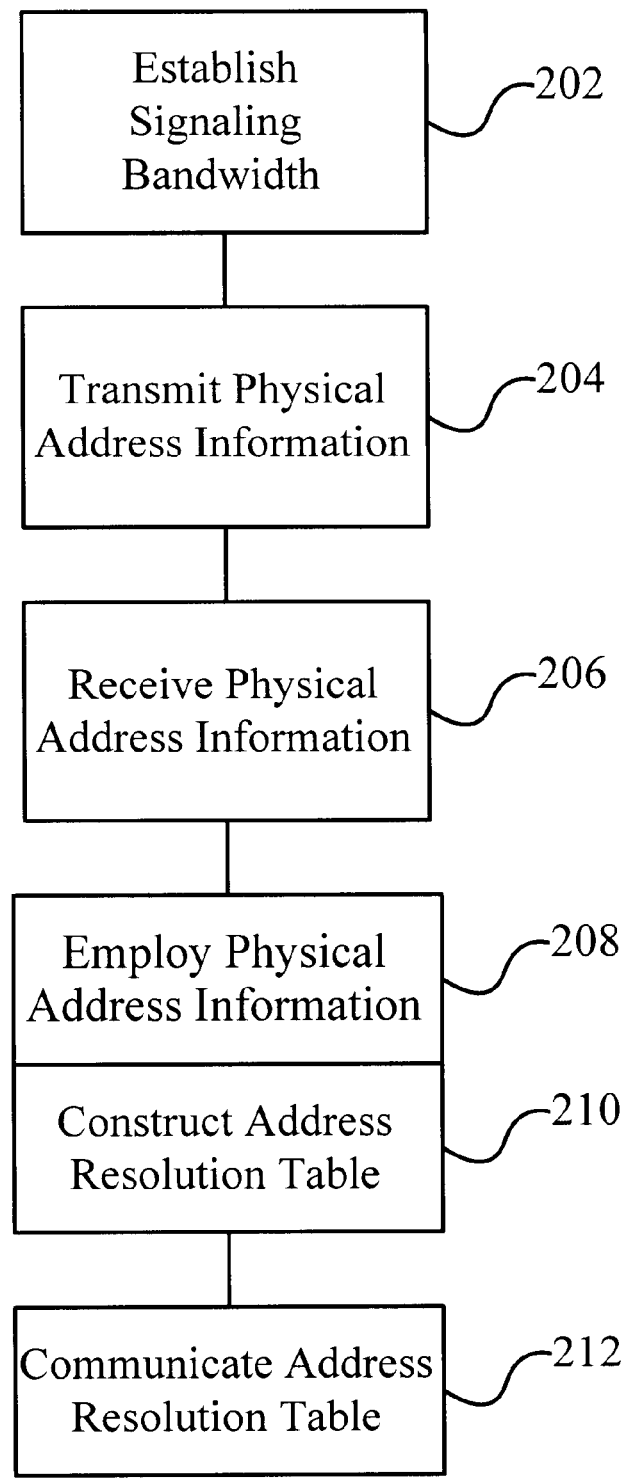
FIG. 2 is a flow diagram illustrating a method of signaling address resolution in a communication network, according to an embodiment of the present invention.

FIG. 2 is a flow diagram 200 illustrating a method of signaling address resolution in communication network 102, according to an embodiment of the present invention. Referring to FIGS. 1 and 2, at step 202 a signaling bandwidth for non-broadcast communication through transmission medium 110 between first network device 104 and neighboring second network device 114, 124.

Figure 3:
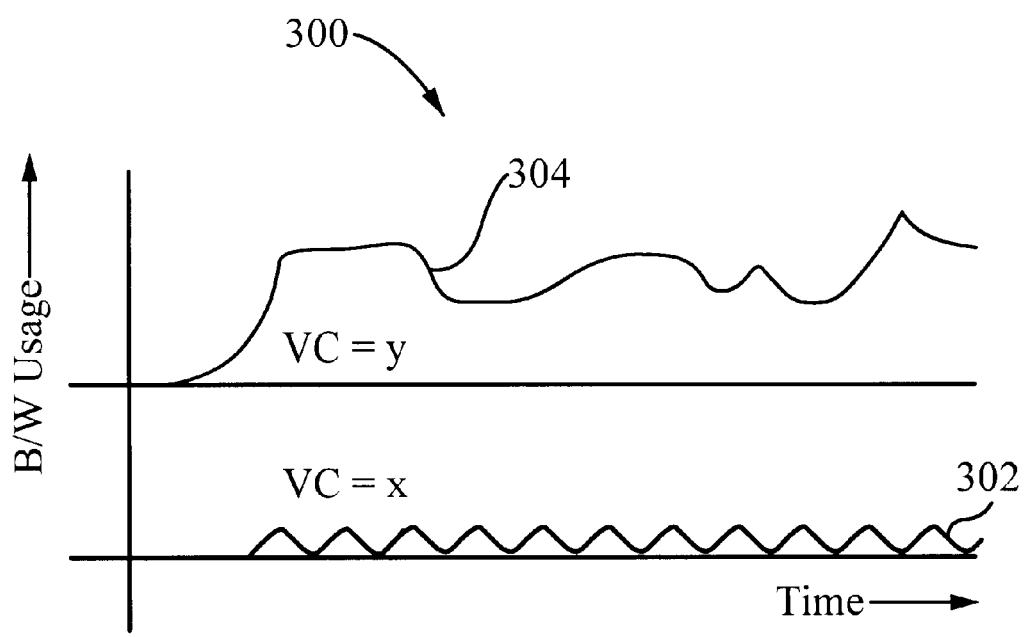
FIG. 3 is a graphic representation illustrating activity in a signaling bandwidth and a communication channel bandwidth as functions of time, according to an embodiment of the invention.

FIG. 3 is a graphic representation 300 illustrating activity in a signaling bandwidth 302 and a communication channel bandwidth 304 as functions of time, according to an embodiment of the invention. Signaling bandwidth 302 lies outside communication channel bandwidth 304. As illustrated in FIG. 3, signaling bandwidth 302 occupies a different virtual circuit identifier (VC=x) relative to that of communication channel bandwidth 304 (VC=y). Both of these bandwidths are carried separately from user data traffic over a distinct optical carrier wavelength. In FIG. 3 are shown examples of bandwidth usage in the vertical axis direction for respective separate bandwidths (virtual circuits) 302 and 304. Bandwidth usage in signaling bandwidth 302 is fixed, whereas bandwidth usage in communication channel bandwidth 304 is variable.

At step 204, physical address information of first network device 104 is transmitted over transmission medium 110 from first network device 104 to neighboring second network device 114, 124 over signaling bandwidth 302. At step 206, the physical address information of first network device 104 is received by second network device 114, 124. The steps of transmitting 204 and/or receiving 206 are typically performed continuously or substantially continuously, thus allowing a continual update of the physical address information. In embodiments including a multiplicity of first network devices is 104 and/or second network devices 114, 124, the physical address information of a first network device 104 is transmitted to and received by at least one of the multiple second network devices 114, 124. At step 208, the physical address information of first network device 104 is employed for controlling network communication between first network device 104 and second network device 114, 124 in communication channel bandwidth 304. Network communication between first network device 104 and second network device 114, 124 in communication channel bandwidth 304 includes, for example, sharing of an application.

In some embodiments, the physical address information of first network device 104 is employed to construct an address resolution table, as illustrated at step 210. In communication network configurations including a multiplicity of second network devices 114, 124, the physical address information is used by at least one of multiple second network devices 114, 124 to control network communication and to construct an address resolution table. In some embodiments as indicated at step 212, the address resolution table is communicated across communication network 102.

In some embodiments of the present invention, referring to FIG. 1 a mesh network 132 or bus network 134 is used instead of ring network 102. As an alternative to an Ethernet architecture, a token ring or token bus network architecture can be used.

Figure 4:
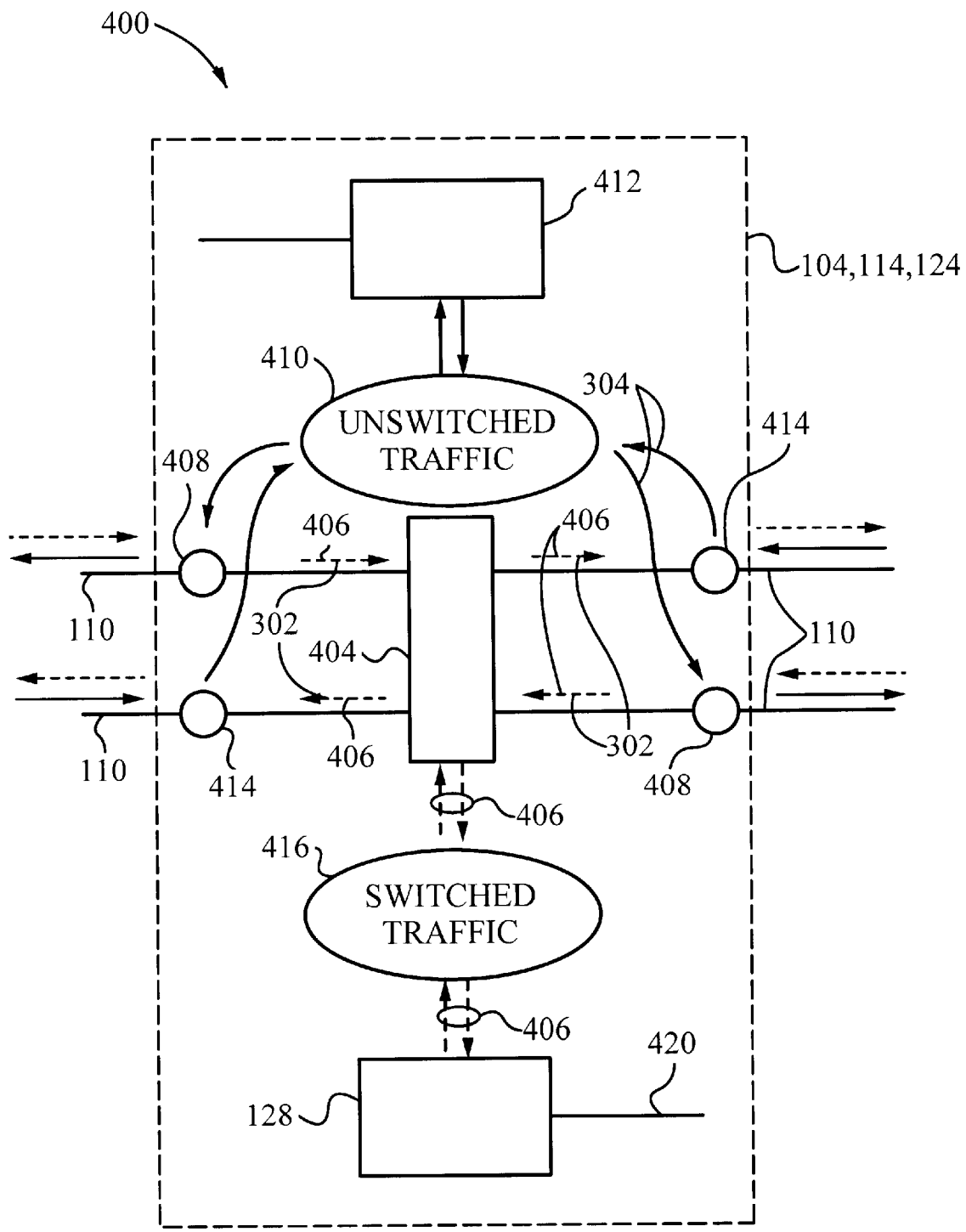
FIG. 4 is a schematic diagram of a typical network device of first or second type connected to a node of a communication network, in accordance with embodiments of the present invention.

FIG. 4 is a schematic diagram of a typical network device 400 of first or second type 104, 114, 124 connected to one of multiple nodes 106, 116, 126 of communication network 102, in accordance with embodiments of the present invention. Referring to FIGS. 1 and 4, a typical network device includes a transmit card 142 in first network device 104 for transmitting physical address information in signaling bandwidth 302 (see FIG. 3) from first network device 104 to second network device 114, 124. Additionally, a typical network device includes a receive card 144 in second network device 114, 124 for receiving physical address information in signaling bandwidth 302 from first network device 104 to second network device 114, 124, as illustrated in steps 208, 210, and 212 of FIG. 2.

A network control device 128 in network device 400 (see also network device 114 of FIG. 1) receives physical address information from receive card 144 and utilizes it to control network communication between first network device 104 and second network device 114, 124 in communication channel bandwidth 304.

At network device 400, incoming transmitted packets in a signaling datastream over signaling bandwidth 302 are separated from routine network communication in communication channel bandwidth 304 using conventional segmentation and reassembly mechanisms 408, 414 that processes various VCs, as in ATM (asynchronous transfer mode) networks. The routine communication is routed through a conventional coupler 410 ("Unswitched Traffic"), which passes communication packets to a network device communication processor 412. Routine traffic is passed to conventional output frequency domain multiplexer 414, where it is combined and sent over transmission medium 110 with outgoing transmissions in signaling bandwidth 302. Signaling packets 406 are directed from demultiplexer 408 to signaling card 404. Using hardware assisted logic, signaling card 404 directs signaling datastream 406 to and from a conventional coupler 416 ("Switched Traffic"). Datastream 406 is then directed to and from processor 128, which resolves the "East" and "West" physical addresses and outputs an address resolution table 420.

For every node, a link-terminated datapath is set up for communication between adjacent signaling cards 404, each containing transmit card 142 and receive card 144. This is accomplished through hardware assisted logic to multiplex signaling datastream 406 through transmission medium 110 over signaling channel 302, for example an ethernet optical ring data channel over an OSC (Optical Supervisory Channel). A host microprocessor 128 on local signaling card 404 has access to this control datastream. An exchange of address information happens in two parts, transmission and reception:

Transmission:

Software on signaling card 404 within a node communicates with its peer entity on a counterpart signaling card within the node, to determine which one is active. Referring to FIG. 1, for example, microprocessor 128 on a local signaling card 146 in network device 114 is active, whereas a microprocessor 130 on a counterpart signaling card 148 is in a standby condition. Once this is determined after startup, active transmit card 142 sends out a signaling MAC address (ethernet address) of the active card to each neighbor node, using the control datastream. This occurs in parallel, since the microprocessor of each signaling card transmits the communication to its neighbor independently. This information is substantially continuously transmitted, to prevent bit corruption during transmission and to decouple the states of the receiving and transmitting entities. If activity changes, the signaling MAC address that is being transmitted is changed to reflect this. The control communication is set up to alert the receiving node, should the received signaling information change.

Reception:

Receiving by the neighbor node is performed continuously. When it is detected that incoming neighbor node information has changed, the signaling MAC address of the neighbor node is extracted from the control stream. For an EAST signaling card, the address received is that of the East neighbor node. Similarly, the WEST signaling card receives the address for the West neighbor node. The signaling cards exchange this information with their counterparts using conventional backplane communication. The node thereby resolves the 'West' and the 'East' neighbor nodes' signaling MAC addresses. An address resolution table is maintained at each signaling card to store this mapping. The address resolution table is attached to the datapath of the signaling packets, so that when a signaling packet is sent for transmission over the 'East' or the 'West' interface, a lookup is performed from the table. The destination MAC address is added to the packet to form a conventional ethernet frame, which is transmitted over the ethernet interface of the microprocessor.

Thereby, in accordance with embodiments of the present invention, a communication network and a method are provided by which physical address information of a neighbor node is transmitted and received without broadcasting over the network. Further, the address information is transmitted automatically and dynamically, enabling the network to update itself without requiring user knowledge of any of the physical address properties of the neighbor node. Among other advantages, this reduces the complexity of information that a network administrator is required to manage.

It will be clear to one skilled in the art that the above embodiment may be altered in many ways without departing from the scope of the invention. For example, For example, the concepts of "East" and "West" neighbor network devices for a ring communication network can be broadened to include link neighbor node Ids for a mesh communication network. Accordingly, the scope of the invention should be determined by the following claims and their legal equivalents.

What is claimed is:

1. A method of signaling address resolution in a communication network between a first network device and a second network device neighboring said first network device and being connected to said first network device by a transmission medium, said communication network utilizing a communication channel bandwidth of said transmission medium for network communication, said method comprising:

a) establishing a dedicated signaling bandwidth in said transmission medium for non-broadcast communication between said first network device and said second network device, said dedicated signaling bandwidth being outside said communication channel bandwidth;

b) periodically transmitting a physical address information of said first network device from said first network device to said second network device over said transmission medium in said dedicated signaling bandwidth;

c) receiving said physical address information of said first network device by said second network device; and d) employing said physical address information for controlling network communication between said first network device and said second network device in said communication channel bandwidth.

2. The method of claim 1, wherein said communication network has a topology selected from the group consisting of a ring network, a mesh network, and a bus network.

3. The method of claim 1, wherein said physical address information is used to construct an address resolution table.

4. The method of claim 3, wherein said address resolution table is communicated across said communication network.

5. The method of claim 1, wherein said transmission medium is selected from the group consisting of electrical conductors and optical fibers.

6. The method of claim 1, wherein said communication network protocol is selected from Ethernet, ATM, and proprietary format.

7. The method of claim 1, wherein said periodic transmitting is performed to continuously update said physical address information.

8. The method of claim 1, wherein said receiving is performed to continuously update said physical address information.

9. The method of claim 1, wherein said physical address is transmitted in said dedicated signaling bandwidth.

10. The method of claim 1, wherein said communication between said first network device and said second network device comprises sharing an application.

11. The method of claim 1, wherein said communication network comprises a plurality of network devices, and wherein said method comprises transmitting said physical address information to at least one of said plurality of said network devices.

12. The method of claim 11, wherein said physical address information is used by at least one of said network devices to construct a network address resolution table.

13. A communication network utilizing a communication channel bandwidth for network communication and having signaling address resolution, said communication network comprising:
   a) a first network device;
   b) a second network device neighboring said first network device;
   c) a transmission medium connecting said first network device and said second network device, said transmission medium supporting a dedicated signaling bandwidth for non-broadcast communication between said first network device and said second network device, said dedicated signaling bandwidth being outside said communication channel bandwidth;
   d) means for periodically transmitting a physical address information of said first network device from said first network device to said second network device over said transmission medium in said dedicated signaling bandwidth;
   e) means for receiving said physical address information of said first network device by said second network device; and
   f) a network control device for processing said physical address information for controlling network communication between said first network device and said second network device in said communication channel bandwidth.

14. The communication network of claim 13, wherein said means for transmitting said physical address information comprises a transmit card mounted in said first network device.

15. The communication network of claim 13, wherein said means for receiving said physical address information comprises a receive card mounted in said second network device.

16. The communication network of claim 13, wherein said transmission medium is selected from the group consisting of electrical conductors and optical fibers.

17. The communication network of claim 13, wherein said communication network has a topology selected from the group consisting of ring networks, mesh networks, and bus networks.

18. The communication network of claim 13, further comprising a plurality of said first network devices and said second network devices.

19. The communication network of claim 13, wherein said communication network architecture is selected from the group consisting of Ethernet configured for carrying IP format traffic and proprietary format traffic.

20. The method of claim 1, wherein said communication channel bandwidth is carried over a first optical wavelength in said transmission medium, and said dedicated signaling bandwidth is carried over a second optical wavelength in said transmission medium, said first and second optical wavelengths being distinct from each other.

21. The communication network of claim 13, wherein said communication channel bandwidth is carried over a first optical wavelength in said transmission medium, and said dedicated signaling bandwidth is carried over a second optical wavelength in said transmission medium, said first and second optical wavelengths being distinct from each other.

22. A network device, which is connected to a second network device via a daisy-chain connection, comprising:
   means for receiving, periodically, signaling information over the daisy-chain connection;
   means for extracting a network address of the second network device from the received signaling information; and
   means for performing data communications with the second network device over the daisy-chain connection using the extracted network address.

23. The network device of claim 22, wherein said means for receiving said signaling information comprises a mounted receive card.

24. The network device of claim 22, wherein said daisy-chain connection comprises an optical fiber.

25. The network device of claim 24, wherein
   said means for receiving is configured to receive said signaling information over said dedicated signaling bandwidth carried over a first optical wavelength in said daisy-chain connection, and
   said means for performing data communications is configured to utilize said communication channel bandwidth carried over a second optical wavelength in said daisy-chain connection, is carried over said first optical wavelength in said daisy-chain connection, and said dedicated signaling bandwidth is carried over said second optical wavelength in said daisy-chain connection, said first and second optical wavelengths being distinct from each other.

26. The network device of claim 22, wherein said daisy-chain connection to said second network device forms at least a portion of an optical ring network.

27. The network device of claim 26, wherein said optical ring network operates according to an Ethernet protocol.

28. The network device of claim 22, further comprising:
   means for using said extracted network address to continuously update an address resolution table.

29. The network device of claim 22, wherein said means for extracting is configured to periodically extract the network address of the second network device in response to the received signaling information being periodically transmitted by the second network device.

* * * * *